United States Patent [19]

Grunke

[11] 4,096,120

[45] Jun. 20, 1978

[54] METHOD OF MAKING A CERAMIC TURBINE WHEEL AND TURBINE WHEEL MADE THEREBY

[75] Inventor: Richard Grunke, Munich, Germany

[73] Assignee: MTU Munchen GmbH, Munich, Germany

[21] Appl. No.: 647,378

[22] Filed: Jan. 8, 1976

[30] Foreign Application Priority Data

Feb. 2, 1975 Germany .............................. 2505652

[51] Int. Cl.$^2$ .............................................. C04B 35/58
[52] U.S. Cl. ........................................ 264/60; 156/89; 264/65; 264/241; 264/332
[58] Field of Search ................... 264/65, 332, 60, 241; 156/89

[56] References Cited

U.S. PATENT DOCUMENTS

| | | | |
|---|---|---|---|
| 3,835,211 | 9/1974 | Coe et al. | 264/332 |
| 3,854,189 | 12/1974 | Ezis et al. | 264/332 |
| 3,876,742 | 4/1975 | Bird | 264/65 |
| 3,887,411 | 6/1975 | Goodyear et al. | 264/65 |
| 3,950,464 | 4/1976 | Masaki | 264/332 |
| 3,966,885 | 6/1976 | May | 156/89 |

Primary Examiner—Robert F. White
Assistant Examiner—John A. Parrish
Attorney, Agent, or Firm—Alan H. Levine

[57] ABSTRACT

A method of making a ceramic turbine wheel which includes making a ceramic ring, and providing a ceramic disc within the ring by supporting the external periphery of the ring and hot pressing a ceramic powder within the ring. Ceramic blades are then sintered to the external surface of the ring using a layer of metallic silicon between each blade and the ring. The ring and blades are produced by a reaction-sintering process.

5 Claims, 3 Drawing Figures

METHOD OF MAKING A CERAMIC TURBINE WHEEL AND TURBINE WHEEL MADE THEREBY

This invention relates to the manufacture of a ceramic turbine wheel.

In the case of ceramic turbine wheels, the turbine disc and the blades must be made from different types of ceramics so that the turbine wheel will be able to meet the differing stresses to which it will be subjected.

Up to now attempts have been made to join the different types of ceramics, used for the disc and blades, by pressing the disc into the reaction-sintered blade row comprising one ring and the attached blades. This method, however, did not give stisfactory results since, due to the presence of the blades, the ring could not be properly supported from the outside and hence did not withstand the high pressure during hot pressing. Therefore, this method is no longer used, although no other feasible method has been found.

Based on these problems the present invention provides for a method of manufacturing a turbine wheel, the individual parts of which are made from different types of ceramics, wherein, as a result of the manufacturing process, a uniform turbine wheel made of ceramics is provided which is able to sustain particularly high stresses.

A particular object of the present invention is to provide a method of manufacturing a turbine wheel characterized by the following operations:

(a) manufacture of a ring by the reaction-sintering process, (b) manufacture of the wheel disc in this ring by hot pressing ceramic powder, and (c) sintering of the blades produced by the reaction-sintering process on to the ring manufactured by the reaction-sintering process Further objects and advantages of this invention will become apparent from the following detailed description read in the light of the accompanying drawings, in which.

Figure 1:
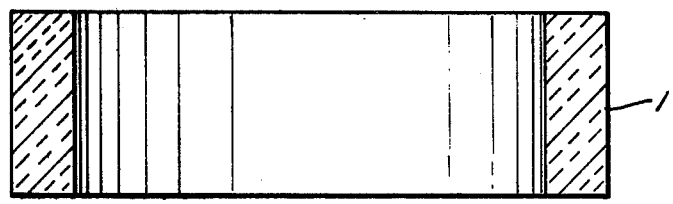
FIG. 1 is an axial cross-sectional view of a ceramic ring.
Figure 2:
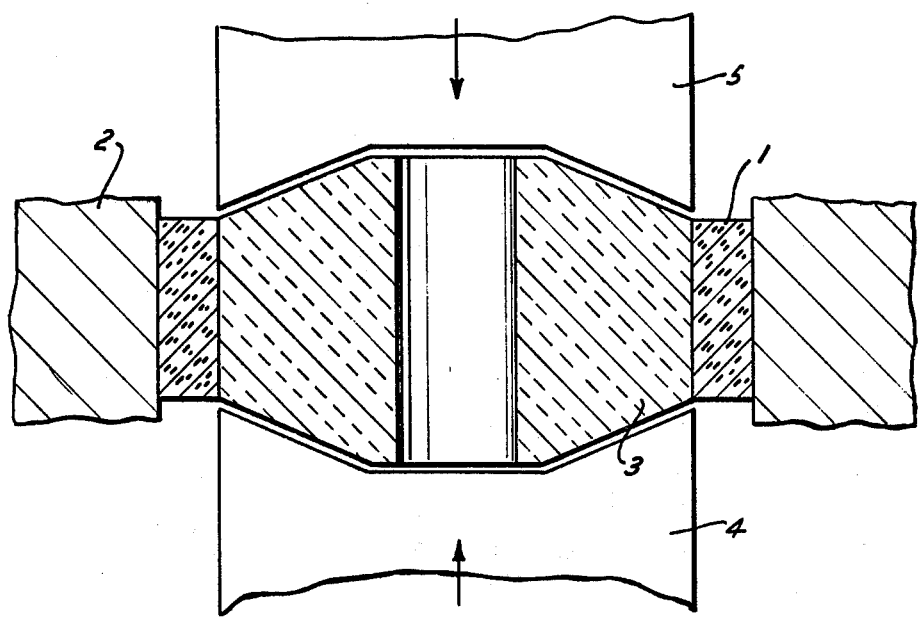
FIG. 2 is an axial cross-sectional view of the ring of FIG. 1 and a ceramic disc being formed within it.

In a first operation, a ring 1 (FIG. 1) is made from silicon powder by the reaction-sintering process. According to the reaction-sintering process, the silicon powder is sintered an atmosphere of nitrogen to transform the silicon into silicon nitride. It is an advantage of the silicon powder (purity approximately 98%) that, if necessary, good shaping in isostatic moulds can be achieved by adding suitable plasticisers. After the transformation of the silicon powder to silicon nitride (ceramic) ring 1 has good heat resistance, but relatively low strength of approximately 20 kgf/mm$^2$.

In a second operation, the ring manufactured in the first operation by the transformation of silicon powder to silicon nitride is placed into an annular mould 2 which reliably prevents the ring from being expanded even under considerably high internal pressure. Now the disc 3 is manufactured by hot pressing silicon nitride powder into the supported ring 1. For this process the two pressing moulds 4 and 5, which must have a suitable contour, are used. If adequate additives, e.g. magnesium oxide, are used, discs with low porosity can be manufactured which have high strength of approximately 80 kgf/mm$^2$. In the case of the ring 1 which is manufactured by reaction-sintering, such a strength is not possible, since a certain degree of porosity must be preserved so that the nitrogen has easy access to all particles of the silicon powder.

During the manufacture of the disc 3, by hot pressing of silicon nitride powder, a sintering process takes place between the ring 1 and the disc 3, so that as a result of the hot pressing process the two parts are firmly connected to each other. As a consequence, the ring 1 is prevented from becoming detached from the disc 3 even at high speeds and corresponding centrifugal forces.

This firm connection is obtaied by the fact that the extremely high pressures applied during hot pressing by means of the pressing tools 4 and 5 become fully effective, because the ring 1 is supported around its outer diameter and thus assuredly prevented from being expanded.

Figure 3:
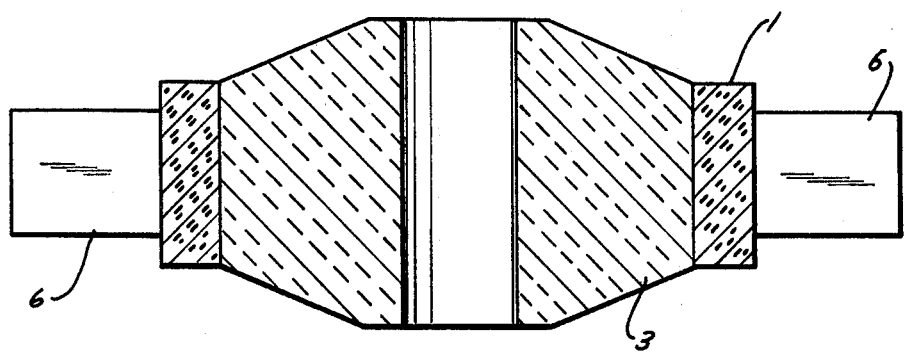
FIG. 3 is an axial cross-sectional view of the complete ceramic turbine wheel.

At the end of the second operation a uniform component in silicon nitride has been produced from the ring 1 and the disc 3. Now, in a third operation, the blades 6 are attached to the outside of the ring 1 (FIG. 3). For this purpose, the ring 1 and the blades 6 are placed into a suitable mould in the correct position with relation to each other. In accordance with a procedure familiar to the person skilled in the art, a layer of silicon (powder or sheets) is placed between the parts to be sintered, i.e., between the blades and ring, and is transformed into ceramics by a reaction process. This results in a reliable and tight joint between blades 6 and ring 1. The individual blades, as well as the ring 1, are manufactured by the reaction-sintering process from, e.g., silicon powder. Whereas for the manufacture of ring 1 in the first operation silicon powder (purity 98%) is used, for the manufacture of disc 3 silicon nitride powder with the chemical composition Si$_3$N$_4$, and additives sold under the name Annasinid D by Annawerk GmbH, are considered particularly suitable.

The result of the manufacturing process is a competely ceramic turbine wheel of nearly equal chemical and similar mechanical material structure, which is able to sustain high mechanical and thermal stresses.

The invention has been shown and described in peferred for only, and by way of example, any many variations may be made in the invention which will still be comprised within its spirit. It is understood, therefore, that the invention is not limited to any specific form or embodiment except insofar as such limitations are included in the appended claims.

What is claimed is:

1. A method of manufacturing a ceramic turbine wheel comprising the steps of:
   (a) making a silicon nitride ring by arranging silicon powder in the form of a ring and reaction sintering the silicon in nitrogen to yield a self-supporting silicon nitride ring;
   (b) making a plurality of turbine bladed by arranging silicon powder in the form of such blades and reaction sintering the powder in nitrogen to transform the powder into self-suporing blades silicon nitride;
   (c) forming a composite component comprising the silicon nitride ring and a disc within the ring by hot pressing silicon nitride powder into the ring to form the disc and to sinter together the outer periphery of the disc and the inner surface of the ring, and supporting the radial outer surface of the ring against expansion during the hot pressing operation; and (d) thereafter bonding the blades to the radial outer surface of the composite disc and ring.

2. A method as defined in claim 1 wherein in step (c) the ring is placed in a mold, and the ceramic powder is compressed in the axial direction of the ring.

3. A method as defined in claim 1 wherein the silicon nitride powder includes, as an additive, magnesium oxide.

4. A method as defined in claim 1 wherein the blades are sintered to the ring, and a layer of silicon is placed between each blade and the ring prior to sintering each blade to the ring.

5. A method of manufacturing a ceramic turbine wheel, comprising the steps of:

(a) making a silicon nitride ring by arranging silicon powder in the form of a ring and sintering the powder in an atmosphere of nitrogen to transform the silicon powder into silicon nitride;

(b) making a plurality of turbine blades by arranging silicon powder in the form of such blades and sintering the powder in an atmosphere of nitrogen to transform the silicon powder into silicon nitride;

(c) forming a composite component comprising the silicon nitride ring and a disc within the ring by hot pressing silicon nitride powder into the ring to form the disc and to sinter together the outer periphery of the disc and the inner surface of the ring, and supporting the radial outer surface of the ring against expansion during the hot pressing operation; and (d) thereafter bonding the blades to the radial outer surface of the composite disc and ring.

* * * * *